United States Patent [19]

Shackle et al.

[11] 4,170,483

[45] Oct. 9, 1979

[54] PROCESS FOR THE PRODUCTION OF SELF-CONTAINED CARBONLESS COPY RECORD SHEETS AND COATING COMPOSITION FOR USE THEREIN

[75] Inventors: Dale R. Shackle; Gerhart Schwab, both of Chillicothe, Ohio

[73] Assignee: The Mead Corporation, Dayton, Ohio

[21] Appl. No.: 710,201

[22] Filed: Jul. 30, 1976

Related U.S. Application Data

[62] Division of Ser. No. 608,768, Aug. 28, 1975.

[51] Int. Cl.$^2$ .............................................. C09D 11/00

[52] U.S. Cl. ........................................ 106/21; 106/22; 106/25; 252/316; 282/27.5; 427/150; 428/327; 428/537

[58] Field of Search ....................... 106/21, 22, 23, 25, 106/193 D; 252/316; 282/27.5; 427/146, 150, 151, 153; 428/323, 327, 537, 919, 914

[56] References Cited

U.S. PATENT DOCUMENTS

| | | | |
|---|---|---|---|
| 2,981,733 | 4/1961 | Kranz | 106/22 X |
| 3,554,735 | 1/1971 | Matsukawa . | |
| 3,672,935 | 6/1972 | Miller et al. . | |
| 3,809,668 | 5/1974 | Yarian | 260/33.4 R |
| 3,819,398 | 6/1974 | Powell et al. | 427/146 |
| 3,859,112 | 1/1975 | Kohmura et al. | 260/29.3 X |
| 3,886,084 | 5/1975 | Vassiliades | 106/22 X |
| 3,900,669 | 8/1975 | Kiritani | 252/316 |
| 3,901,986 | 8/1975 | Brockett et al. | 428/411 |
| 3,916,068 | 10/1975 | Kohmura et al. | 428/411 |
| 3,943,063 | 3/1976 | Morishita et al. | 252/316 |
| 4,010,038 | 3/1977 | Iwasaki et al. | 106/22 |
| 4,010,292 | 3/1977 | Shackle et al. | 428/914 X |
| 4,025,455 | 5/1977 | Shackle | 428/914 X |
| 4,039,207 | 8/1977 | Ishizuka | 428/914 X |

*Primary Examiner*—Hosea E. Taylor
*Assistant Examiner*—Amelia B. Yarbrough
*Attorney, Agent, or Firm*—Charles N. Shane, Jr.; Stephen H. Cagle; Wilson G. Palmer

[57] ABSTRACT

In accordance with certain of its aspects, the novel process of this invention for making pressure-sensitive record sheets comprises the steps of forming a dispersion of microcapsules, the microcapsules being the product of microencapsulating a solution of a color precursor in an oil carrier; the walls of the microcapsules being substantially oil and water impermeable; forming an aqueous mixture containing a color developer for the encapsulated color precursor; adding a color suppressant to the dispersion of microcapsules, to the aqueous mixture or partially to both in an amount or amounts effective to substantially prevent color formation between the color developer and any unencapsulated color precursor; the color suppressant being a nitrogen containing basic organic compound selected from the group consisting of: amines, imines and aziridines; combining the aqueous mixture containing the color developer, the color suppressant and the microcapsules to form an aqueous coating composition; and applying the aqueous coating composition to a substrate in a single pass through substrate coating apparatus.

In accordance with certain other aspects of this invention, the novel product of this invention is an aqueous slurry for coating pressure-sensitive record sheets, the novel slurry including a plurality of microcapsules, the microcapsules containing a solution of a color precursor in an oil carrier, the walls of the microcapsules comprising a reaction product of a wall forming compound and a cross-linking agent; a color developer for the color precursor; and a color suppressant comprising a nitrogen containing basic organic compound selected from the group consisting of: amines, imines and aziridines, the color suppressant being present in the aqueous slurry in an amount sufficient to substantially prevent color formation between the color developer and any unencapsulated color precursor.

6 Claims, No Drawings

PROCESS FOR THE PRODUCTION OF SELF-CONTAINED CARBONLESS COPY RECORD SHEETS AND COATING COMPOSITION FOR USE THEREIN

This is a division of application Ser. No. 608,768, filed Aug. 28, 1975.

DESCRIPTION OF THE PRIOR ART

As is well known to those skilled in the art, carbonless, pressure-sensitive record sheets are useful in a variety of systems, for example, computer print outs, credit card systems or other pressure marking applications where it is advantageous to eliminate the necessity of a typewriter ribbon or an independent ink supply. It has been a common practice for microcapsules or other like devices containing a color precursor to be coated on the back of a record sheet and a color developer for the color precursor to be coated on the front of a second sheet. Thus, when the two sheets were pressed together by a writing instrument or other imprinting device a color forming reaction would take place and an image copy would be recorded.

However, recent developments have indicated that the microcapsules, containing the color precursors, and the color developer solution could be coated on paper or a similar substrate in a single coating application. Attempts to do so have, however, resulted in unsatisfactory final coated products. More particularly, early attempts to coat paper with a slurry containing both color developer and color precursor resulted in premature color formation. This premature color formation is thought to be the result of one or more of several variable factors. Under even the most ideal operating conditions unencapsulated color precursor is present in the aqueous slurry material in at least small quantities. This unencapsulated color precursor is thought to react with the color developer to result in the preliminary color formation. In addition, the temperature and pressure conditions encountered in drying, storage and handling of the pressure sensitive record sheets contributes to the premature color development. The color development found during the drying operation is thought to result from seepage of the color precursor from the microcapsules. It has now been established that all of these factors and others have a bearing on the presence of unencapsulated color precursor in the aqueous slurry composition. In response to the premature color development problem a variety of possible solutions have been theorized and attempted, all of which were abandoned due to the adverse effect on the final paper product or due to cost efficiencies.

The initial solution to the premature color development problem was running paper through the coating apparatus twice. On the first coating run the microcapsule/color precursor containing layer was applied to the paper and the paper was dried. On the second pass of the same side of the paper through the coating apparatus, the color developer was applied and once again the paper was dried. The impracticality of this process is obvious. First, this requires twice the time for the coating operation and thus substantially increases the expense of the final product. Secondly, the paper and coating compositions are exposed to heat and handling twice as much as is normally necessary. Finally, this operation still does not prevent the unencapsulated color precursor from reacting with the color developer which may be present, it merely minimizes the aqueous contact of the color developer and microcapsules. Hence, extensive research efforts have focused on finding a method whereby microcapsules containing color precursors and an aqueous solution of a color developer can be mixed in a single slurry and coated on paper in a single pass through coating apparatus.

The production of self-contained copy sheets having a color developer, a color precursor and a common solvent for each maintained in isolation on one surface of a paper base is known. Examples of such self-contained sheets are described in:

U.S. Pat. No. 3,663,256 (1972) to Miller et al
U.S. Pat. No. 3,672,935 (1972) to Miller et al
U.S. Pat. No. 3,732,120 (1973) to Brockett et al
U.S. Pat. No. 3,732,141 (1973) to Brockett et al Typically, in these patents the color precursor is dissolved in its carrier liquid and the color developer is applied to the substrate as a separate coating. Single pass coating compositions are disclosed in:

U.S. Pat. No. 3,554,781 (1971) to Matsukawa
U.S. Pat. No. 3,576,660 (1971) to Bayless et al Coloring of the aqueous composition is noted in the description of both of the above mentioned single pass patents.

The processes and coating compositions of the prior art are inferior to those taught by the novel process and aqueous slurry coating composition of this invention in several respects. For one, the color developer must be encapsulated in the prior art. This is disadvantageous in that microencapsulation is at best a difficult step and one which of necessity involves the excess expenditure of time and money. In addition, in the absence of the use of a color suppressant substantial premature color development occurs and thus results in an inferior final product especially when considered in terms of whiteness and durability during handling and the application of heat during drying. Also, use of the processes and coating compositions of the prior art prevents the use of the more severe conditions sometimes found preferable or even necessary in the manufacture of certain types of paper. More particularly, heated drying steps at elevated temperatures and the like cannot be used without adversely affecting the final appearance of the paper. Finally, the use of the processes and coating compositions of the prior art prohibits the manufacture of commercially-acceptable pressure-sensitive, self contained record sheets in a single run or pass through coating apparatus. As developed supra the necessity of multiple passes through coating apparatus results in higher costs in terms of money, time and material.

SUMMARY OF THE INVENTION

In accordance with certain of its aspects, the novel process of this invention for making pressure-sensitive record sheets may comprise forming a dispersion of microcapsules, said microcapsules being the product of microencapsulating a solution of a color precursor in an oil carrier, walls of the microcapsules being substantially oil and water impermeable; forming an aqueous mixture containing a color developer for the color precursor; adding a color suppressant to the aqueous mixture containing the color developer or to the dispersion of microcapsules or to both in an amount or amounts effective to substantially prevent color formation between the color developer and any unencapsulated color precursor, the color suppressant comprising a nitrogen containing basic organic compound selected from the group consisting of amines, imines and aziridines; mixing the dispersion of microcapsules, the aqueous mixture and the previously added color suppressant to form an aqueous coating composition; and applying the aqueous coating composition to a substrate. This invention further relates to a novel aqueous slurry composition for coating pressure-sensitive record sheets, the novel aqueous slurry including a plurality of microcapsules, the microcapsules containing a solution of a color precursor in an oil carrier, the walls of the microcapsules comprising a reaction product of a wall forming compound and a cross-linking agent; and color developer for the color precursor; and a color suppressant comprising a nitrogen containing basic organic compound selected from the group consisting of amines, imines and aziridines; the color suppressant being present in the aqueous slurry in an amount sufficient to substantially prevent color formation between the color developer and any unencapsulated color precursor.

DESCRIPTION OF THE INVENTION

Microcapsules similar to the ones used in both the process and product of this invention can be obtained commercially or can be manufactured according to several known techniques. The most frequently used process for the formation of microcapsules for color precursors in an oil solution is coacervation. More particularly, the production of microcapsules containing oils is disclosed in U.S. Pat. No. 2,800,457 (1957) to Green et al. Coacervation involves the coating of oil droplets with a liquid wall of gelatin-gum arabic colloidal material produced by coacervation. The liquid wall is hardened by treatment with formaldehyde.

Since the disclosure by Green et al, a number of processes for producing oil containing microcapsules have been described in patent literature and elsewhere. These include processes which employ interfacial polymerization, polymerization of an oil soluble monomer and spray drying as well as improvements in the processes which utilize coacervates. While the coacervation method is well known and convenient it nevertheless produces a gelatin type microcapsule which is notorious for high seepage and high water absorption. Therefore, for purposes of this application, the formulation or manufacture of microcapsules will preferably not be by means of coacervation.

An alternate method for the production of microcapsules, is taught by U.S. Pat. No. 3,796,669 (1974) to Kiritani et al and is referred to herein as the second method for microcapsule production. This second method for the production of microcapsules, includes the steps of mixing a polyvalent polyisocyanate as a first wall forming material with a second wall forming material which is capable of producing a high molecular weight compound by reaction with the polyisocyanate in an oily liquid. This reaction forms a mixture, the mixture is dispersed or emulsified in a polar liquid to form a continuous phase and the continuous phase is reacted with the polyvalent isocyanate and the second wall forming material to form the microcapsule wall from the inside of the oil droplet. The second wall forming material used in the second method for microcapsule production is selected from the group consisting of the epoxy compounds, acid anhydride compounds, compounds having at least two groups selected from the class consisting of a hydroxyl group, a thiol group, an amino group, a carboxylic acid group, and prepolymers of these compounds. This process results in the formation of microcapsules containing encapsulated color precursors which are suitable for the novel process of this invention.

A third and preferred method for the production of microcapsules comprises the reaction of a wall forming compound, preferably hydroxypropylcellulose, with an oil soluble cross-linking agent. Hereinafter, the capsule which results from the reaction of hydroxypropylcellulose and a crosslinking agent will sometimes be referred to as an HPC capsule. The preferred microencapsulating process includes the steps of preparing an aqueous solution containing a hydroxypropylcellulose wall forming compound containing reactive hydroxyl groups and being characterized by having decreasing solubility with increasing temperature in aqueous solution. The aqueous wall forming compound solution is prepared while the temperature of the aqueous solution is maintained at less than about 45° C. Importantly, the viscosity of the hydroxypropylcellulose decreases dramatically at the precipitation temperature for the hydroxypropylcellulose of from about 45° C. to about 52° C. This sharp viscosity decrease indicates the formation of a substantially solid microcapsule wall.

With respect to this third method a linking agent for the wall forming compound and a color precursor which is to be encapsulated. The oil solution can be prepared by adding and stirring in the oil soluble cross-linking agent while the mixture is cool, preferably below 15° C. The choice of oil depends largely on the final utilization of the microcapsules. If, for example, the microcapsules are to be used in preparing pressure sensitive papers, the oils can be monoisopropylbiphenyl, the chlorinated biphenyls, the alkylnaphthalenes, kerosene, and petroleum naphtha or mixtures thereof. The preferred oil soluble cross-linking agent is a polyfunctional isocyanate.

The oil soluble cross-linking agents of the third method used in the novel process and product of this invention are those containing more than one group capable of reacting with hydroxyl groups thus providing the desired cross-linkage. They must be soluble in the oil phase and not reactable with the oil or interfere with the desired function of any component of the oil phase. For example, if an oil solution of a color precursor is desired to be encapsulated and coated on paper, the cross-linking agent should not interfere with the color producing function of the resulting coated paper. In general, polyfunctional isocyanates, acyl chlorides, phosphoryl chlorides, sulfonyl chlorides, alkylene bischloroformates and mixtures thereof can be used. The concentration of the oil soluble cross-linking agent in the oil phase is not critical. The degree of cross-linking desired is dependent on the end utilization of the microcapsules. For example, if the microcapsules are to be incorporated into an aqueous coating composition, sufficient reactive groups must be present to react with available hydroxyl groups of the HPC to render the HPC water insoluble. The process of microcapsulation is more fully disclosed in commonly assigned, pending U.S. Patent application Ser. No. 480,956 filed June 19, 1974, now U.S. Pat. No. 4,025,455, issued May 24, 1977.

The preferred color precursor for use in the third method of microencapsulation is crystal violet lactone. The aqueous HPC capsule mixture is mixed with the cross-linking agent solution in a manner such that an emulsion is formed having droplets of the oil solution dispersed in the aqueous solution. The resulting emulsion is heated to a temperature of from about 45° C. to about 52° C. to cause precipitation of the hydroxypropylcellulose wall forming compound on the droplets of the oil solution. The temperature of the heated emulsion is maintained at from about 45° C. to about 52° C. for longer than about 1 hour to permit the microcapsule walls to become substantially oil and water impermeable. The microcapsules should be from about 0.1 micron to about 50 microns in diameter, the preferred range being from about 0.5 microns to about 26 microns and the most preferred range being from about 5 microns to about 15 microns in diameter. Ideally, all the microcapsules would have a diameter of about 12 microns although in practice a mixture of sizes is usually obtained. The microcapsules after being allowed to cure, are stored for future use. Storage conditions should be such that extremes in temperatures are not encountered.

An aqueous mixture containing a color developer for the color precursor encapsulated in the microcapsules is prepared. The aqueous mixture is prepared by adding the color developer to water. The typical color developers for the color precursor are the phenolic resins. The most preferred color developer is an oil soluble phenol-formaldehyde novolak resin. Most preferably the color developer, when it is a phenolic resin or a novolak resin, is in the form of a grind. The grind is in the form of minute particles which form a convenient dispersion in the aqueous medium. The preferred individual particle size is from about 0.1 micron to about 15 microns in diameter while the most preferred individual particle size, to form the most effective dispersion, is from about 3 microns to about 9 microns. The average particle size could be expected to be approximately 6 microns although agglomeration may take place to some extent. The amount of color developer which is added to a unit volume of water to form the aqueous dispersion is dependent upon several variable factors. These variables include the particular color precursor being used, the drying time desired, the type of drying to be used on the paper. The particular color developer used and others. The typical resin grind dispersion concentration range has been found to be from about 35% to about 65% solids by weight ot the total aqueous color developer dispersion, the preferred range from about 45% to about 55% solids by weight, and the most preferred range from about 48% to about 52% solids.

The microcapsules containing the encapsulated color precursor are mixed with the aqueous mixture containing the color developer to form an aqueous coating composition. The most effective concentration range of the resin grind in the aqueous coating composition has been found to be from about 10% to about 50% solids by weight of the total aqueous coating composition, the preferred range from about 15% to about 40% solids by weight, and the most preferred range from about 20% to about 30% solids. The preferred weight ratio of microcapsules to aqueous color developer is from about 1 part microcapsules to about 2 parts color developer to about 2 parts microcapsules to about 1 part color developer, while the most preferred ratio is from about 1 part microcapsules to about 1 part color developer. The resulting mixture includes all the chemical ingredients normally found in a carbonless copy paper system. However, past experience has shown that if this mixture is coated onto a substrate such as paper and dried, the end product will have severe premature color formation with the passsage of time or upon the application of heat. This premature color formation is unacceptable in a paper manufacturing process.

A color suppressant can be added to either the aqueous microcapsule dispersion or the aqueous dispersion containing the color developer, but the addition must be prior to mixing of the aqueous dispersions in order to effectively prevent color formation. The amount of color suppressant necessary to perform the desired levels of inhibition varies from product to product but in typical ranges from about 0.1 part color suppressant by weight to about 10 parts color suppressant by weight based on the total dry weight of the coating composition. While the typical range of color suppresant is from about 0.1 part by weight to about 10 parts by weight a preferred range is from about 0.5 part by weight to about 4 parts by weight. The most preferred range of color suppressant addition is from about 1 part by weight to about 2 parts by weight. As indicated, the reference to parts by weight of color suppressant as used herein are based on the total dry weight of the coating composition.

There are a variety of color suppressants which are known. However, the process of this invention encounters certain problems not normally encountered in most color inhibition processes. Specifically, the color inhibitor must be such that it would not inhibit or affect the color formation in the final product. In addition, the color suppressant must not adversely affect the coating composition. The color suppressants are typically selected from the nitrogen containing basic organic compounds which are available for addition to paper coating compositions. The preferred groups from which the nitrogen containing basic organic compounds are selected are the amines, imines, and the aziridines. The most preferred color suppressants are polyfunctional aziridine and polyethylenimine.

In the actual practice of the process of this invention other ingredients may be added to the coating composition in order to more effectively manufacture a desirable final product. These additional ingredients can be, but are not limited to, optical brighteners, binders, sequestering agents, emulsifiers, and water soluble crosslinking agents which aid in making the coating composition effective. A particularly preferred binding material for use in combination with the preferred oil soluble phenolformaldehyde novolak resin color developers is polyvinyl alcohol. These and other optional ingredients can be added to desired levels depending on the final product desired and the make up of the aqueous coating composition.

After the aqueous coating composition has been completed, it is applied to a substrate, preferably paper. The paper substrate with the liquid coating must be dried. The drying step can take the form of any several well known methods of drying. The most preferred is by means of the application of heat. In most commercial paper manufacturing operations the drying step takes place at temperatures sufficient to cause evaporation of water from aqueous compositions. Under normal circumstances, if the color suppressant of this invention were not present in the coating composition a color forming reaction would take place between unencapsulated color precursor and the color developer in the coating composition. However, in the presence of the color suppressant this reaction does not occur and the coated paper can be effectively dried without significant color formation. This removes a critical barrier in the process of manufacturing self-contained carbonless paper in a single pass through a coating machine.

The aqueous coating composition of the process of this invention is in the form of an aqueous slurry. Included in the aqueous slurry are a plurality of microcapsules, the microcapsules including a color precursor in an oil carrier, a color developer for said color precursor and a color suppressant. Other optional ingredients include an optical brightener, a binder, such as polyvinyl alcohol and others.

DETAILED DESCRIPTION OF THE PREFERRED EMBODIMENT

Practice of the novel process of this invention is apparent from the following illustrated examples of preferred embodiments wherein, as elsewhere, all parts are parts by weight, unless otherwise specified. The following examples are by way of illustration and not limitation.

EXAMPLE 1

In accordance with the practice of a preferred embodiment of the novel process of this invention an aqueous coating composition is prepared according to the formula found in Table 1. More specifically, 5 gms. of polyvinyl alcohol is dissolved in 95 ml. of water. Microcapsules, which are a reaction product of hydroxypropylcellulose and polyfuntional isocyanate, are added to the polyvinyl alcohol-water solution, in the amount indicated by Table 1, the microcapsules having encapsulated therein a crystal violet lactone color precursor. Other ingredients are added in amounts indicated by Table 1. Rhoplex MV-1 an acrylic latex is added to the microcapsule-water polyvinyl alcohol dispersion as a binding material. Stilt material, dry arrowroot starch or Keestar 339 starch, is added as a smudge-preventing ingredient. A polyfunctional aziridine sold under the trade name Ionac Pfaz 300 is added in an amount of 1% by weight of the total solids of the coating color. A sequestering agent sold under the trade name Dequest 2006 is added to the ingredients. To this mixture, an optical brightener, Blancophor S2BP (GAF) and an aqueous grind of a developing resin is added. This combination of ingredients is mixed by conventional mixing means.

TABLE 1

| General Description | Specific Description | Tradename | Percent Solid | Parts by Weight |
|---|---|---|---|---|
| Color Precursor | Crystal violet lactone | | | |
| Microcapsules | HPC + polyfunctional isocyanate | | 40.0 | 27.5 |
| Binder | Polyvinyl alcohol | Vinyl 205 | 5.0 | 5.0 |
| | Acrylic latex | Rhoplex MV-1 | 46.0 | 7.0 |
| Stilt Material | Cross-linked Wheat Starch | Keestar 339 | 90.0 | 30.0 |
| Color suppressant | Polyfunctional aziridine | Ionac Pfaz 300 | 70.0 | 1.0 |
| Sequestering Agent | | Dequest 2006 | 100.0 | 1.6 |
| Optical Brightener | Stilbene derivative | Blancophor S2BP | 25.0 | 1.1 |
| Color developer | Novolak resin | Resin grind | 52.3 | 28.8 |

A well agitated mixture of the above aqueous coating composition is coated on paper and dried using heat to form a very well performing white self-contained pressure-sensitive sheet.

EXAMPLE 2

The following mixture was prepared exactly as the mixture of Example 1 was prepared with the single exception that the ingredients were mixed in the amounts indicated by Table 2, to form an aqueous coating composition.

TABLE 2

| General | Description | Tradename | Percent Solid | Pts. by Weight |
|---|---|---|---|---|
| Color precursor | Crystal violet lactone | | | |
| Microcapsules | HPC + polyfunctional is cyanate | | 40.0 | 25.9 |
| Binder | Polyvinyl alcohol | PVA 5105G | 5.0 | 8.0 |
| | Acrylic latex | Rhoplex MV-1 | 46.0 | 6.0 |
| Stilt Material | Cross linked Wheat Starch | Keestar 339 | 90.0 | 31.0 |
| Color suppressant | Polyfunctional aziridine | Ionac Pfaz | 70.0 | 2.0 |
| Sequestering Agt. | Pentasodium salt of amino-trimethylphosphonic acid | Dequest 2006 | 100.0 | 1.6 |
| Color Developer | Novolak Resin | Resin grind | 52.3 | 25.5 |

White paper was coated with the above aqueous coating composition and stored at room temperature for 24 hours. Upon observation after 24 hours, the color of the paper had remained white despite the fact that no optical brighteners were included. A sample of the coated paper composition was stored for 6 hours at 90° C. The samples thus stored were still white after 6 hours.

EXAMPLE 3

The following aqueous coating composition was prepared exactly as the aqueous coating composition of Example 2 with the exception that polyethylenimine was used as the color suppressant instead of polyfunctional aziridine and the microcapsules were formed according to the process described as the second process in the specification.

TABLE 3

| General | Description | Tradename | Percent Solid | Pts. by Weight |
|---|---|---|---|---|
| Color precursor | | crystal violet | | |

TABLE 3-continued

| General | Description | Tradename | Percent Solid | Pts. by Weight |
|---|---|---|---|---|
| | | lactone | | |
| Microcapsules | Second Process | | 40.0 | 25.9 |
| Binder | Polyvinyl alcohol | PVA 5105G | 5.0 | 8.0 |
| | Acrylic latex | Rhoplex MV-1 | 46.0 | 6.0 |
| Stilt material | Dry Arrowroot Starch | | 90.0 | 31.0 |
| Color suppressant | Polyethylenimine | PEI - 1000 | 70.0 | 2.0 |
| Sequestering Agt. | Pentasodium salt of aminotrimethylphosphoric acid | Dequest 2006 | 100.0 | 1.6 |
| Color developer | Novolak resin | Grind | 52.3 | 25.5 |

As in example 2, samples of the coated pressure-sensitive paper prepared in accordance with procedure of example 3, were stored at room temperature for 24 hours and at 90° C. for 6 hours. Both samples remained completely white after the storage periods. It was concluded that the paper would perform well as pressure-sensitive carbonless paper.

EXAMPLE 4

A first solution hereinafter referred to as Solution A and a second solution hereinafter referred to as Solution B are prepared.

Solution A

The following chromogens are dissolved in 150 ml. MIPB (Monoisopropyl biphenyl) at 85° C.:

7.0 Crystal violet lactone 0.9 g 3,3-bis-('-ethyl-2'-methylindol-3'-yl)phthalide 1.8 g 2-dibenzylamino-6-diethylaminofluoran 2.9 g 2,3-(1'-phenyl-3'-methyl-4',5'-pyrazol)-7-diethylamino-4-spirophthalido-chromene.

This solution is cooled to 10° C. and the following materials are dissolved:

6.9 g EIJ-2000 (aliphatic, biuret-containing triisocyanate)

2.4 g Niax SF-50 (toluene diisocyanate prepolymer, Union Carbide)

40 ml Base H (deodorized kerosene)

0.02 g Dibutyltin dilaurate (catalyst)

Solution B

In 285 ml of 25° C. water 6.6 g of Klucel (hydroxypropylcellulose, Hercules Chemical Co.) and 1.6 g of Parez 707 (methylated melamine formaldehyde addition product, American Cyananid) is dissolved.

Solution B is placed in a blender and Solution A is added to form an emulsion of the desired particle size (5–10 micron average). The emulsion is then heated to 50° C. while being agitated. After 4–6 hours at this temperature the capsules formed are ready for use. Capsules with thicker or (thinner) walls can be made by increasing (decreasing) the amounts of EIJ-200, Niax SF-50 and Klucel L., keeping everything else constant.

Coating

The following materials were stirred together (based on dry weight):

| | Coating 1 | Coating 2 |
|---|---|---|
| Capsules (from above) | 27.4 g | 25.9 g |
| PVA 51-05 G | 8.0 g | 8.0 g |
| Rhoplex MV-1 (acrylic latex, Rohm & Haas) | 6.0 g | 6.0 g |
| Dry Arrowroot Starch | 31.0 g | 31.0 g |

-continued

| | Coating 1 | Coating 2 |
|---|---|---|
| Ionac Pfaz 300 | .5 g | 2.0 g |
| Dequest 2006 | 1.6 g | 1.6 g |
| Resin grind | 25.5 g | 25.5 g |

The resulting white coating color stayed white after sitting at room temperature for 24 hours. Paper was coated with this material using a draw down technique with a Meyer Bar. The paper was dried with a "heat gun" and placed in a 90° C. oven for 10 minutes, after which time it was still white. 16 hours at 65° C. failed to discolor the paper. Ability to mark on this paper was not impaired after the exposure to elevated temperatures.

EXAMPLE 5

As in Example 4 two solutions were prepared (Solutions A and B) according to the following formulas.

Solution A

The following chromogens are dissolved in 240 ml of MIPB of 85° C.:

| | |
|---|---|
| 10.4 g | Crystal violet lactone |
| 1.3 g | 3,3-bis-(1'-ethyl-2'-methylindol-3'-yl)-phthalide |
| 2.6 g | 2-dibenzylamino-6-diethylaminofluoran |
| 4.3 g | 2,3-(1'-phenyl-3'-methyl-4', 5'-pyrazol)-7-diethylamino-4-spirophthalideo-chromene. |

This solution is cooled to 10° C. and the following materials are dissolved:

| | |
|---|---|
| 8.7 g | E1J-2000 |
| 2.4 g | Niax SF-50 |
| 55 ml | Base H |
| 0.6 g | Quadrol (N,N,N',N'-tetrakis [2-hydroxypropyl]-ethylendiamine, Wyandotte Corp.) |

Solution B

In 620 ml of 25° C. water 15 g of Carboxymethyl cellulose -7L2 (Hercules) and 30 g Vinol 205 (Dupont) is dissolved.

Solution B was placed in a blender and Solution A was emulsified into B (high setting, 2 minutes). The emulsion was then kept at 60° C. for 1½ hours while being agitated. The capsules were then ready for use.

Coating

The following materials were stirred together (based on dry weight):

| | |
|---|---|
| Second process | 25.9 g |
| PVA-5105 | 8.0 g |
| Rhoplex MV-1 | 6.0 g |
| Arrowroot | 31.0 g |
| Ionac Pfaz 300 | 2.0 g |
| Dequest 2006 | 1.6 g |
| Resin grind | 25.5 g |

The coating formulation stayed white for 6–7 hours after which time it slowly turned blue. A white sheet of self-contained could be made with a drawdown technique and "heat gun" drying. This sheet turned blue immediately after it was placed in a 90° C. oven. Its color was not noticeably changed on exposure to 60° C. for 6 hours.

What is claimed is:

1. An aqueous slurry for coating pressure-sensitive record sheets, said aqueous slurry including:
(a) a plurality of microcapsules, said microcapsules containing a solution of a color precursor in an oil carrier, said color precursor in said oil carrier being capable of forming a color with a color developer without heating to an elevated temperature, said microcapsules having walls comprising a reaction product of a wall forming compound and a cross-linking agent; wherein said wall forming compound is hydroxypropylcellulose and said cross-linking agent is selected from the group consisting of polyfunctional isocyanates, acyl chlorides, phosphonyl chlorides, sulfonyl chlorides, alkylene bis-chloroformates and mixtures thereof;
(b) a solid particulate color developer for said color precursor; and
(c) a color suppressant comprising a nitrogen containing basic organic compound selected from the group consisting of: amines, polyethylenimines and aziridines, said color suppressant being present in said aqueous slurry in an amount of from about 0.1 percent to about 5.0 percent based on the dry weight of said slurry, said amount being sufficient to substantially prevent color formation between said color developer and any unencapsulated solution of said color precursor in said oil carrier.

2. The aqueous slurry of claim 1 wherein said color suppressant is polyfunctional aziridine.

3. The aqueous slurry of claim 1 further including an optical brightener, said optical brightener being a stilbene derivative.

4. The aqueous slurry of claim 1 further including a sequestering agent, said sequestering agent being a pentasodium salt of aminotrimethylphosphoric acid.

5. An aqueous slurry for coating pressure-sensitive record sheets, said aqueous slurry including:
(a) a plurality of microcapsules, said microcapsules containing a solution of a color precursor in an oil carrier, said color precursor in said oil carrier being capable of forming a color with a color developer without heating to an elevated temperature, said microcapsules having walls comprising a reaction product of hydroxypropylcellulose and a cross-linking agent, said cross-linking agent being a polyfunctional isocyanate;
(b) a solid particulate color developer for said color precursor, said color developer being an oil soluble phenolformaldehyde novolak resin;
(c) a color suppressant, said color suppressant being present in an amount of from about 0.1 percent to about 5.0 percent based on the dry weight of said slurry, said amount being sufficient to substantially prevent color formation between said color developer and any unencapsulated solution of said color precursor in said oil carrier, said color suppressant being a nitrogen containing basic organic compound selected from the group consisting of: amines, polyethylenimines, and polyfunctional aziridines; and
(d) a binder for said aqueous slurry, said binder being polyvinyl alcohol.

6. An aqueous slurry for coating pressure-sensitive record sheets, said aqueous slurry including:
(a) a plurality of microcapsules, said microcapsules containing a solution of a color precursor in an oil carrier, said color precursor in said oil carrier being capable of forming a color with a color developer without heating to an elevated temperature, said microcapsules having walls formed by the reaction of a polyvalent polyisocyanate with a second wall forming compound, said second wall forming compound being selected from the groups consisting of epoxy compounds, acid anhydride compounds, compounds having at least two groups selected from the class consisting of a hydroxyl group, a thiol group, an amino group, and a carboxylic acid group, and prepolymers of said compounds;
(b) a solid particulate color developer for said color precursor; and
(c) a color suppressant comprising a nitrogen containing basic organic compound selected from the group consisting of amines, polyethylenimines and aziridines, said color suppressant being present in said aqueous slurry in an amount of from about 0.1 percent to about 5.0 percent based on the dry weight of said slurry, said amount being sufficient to substantially prevent color formation between said color developer and any unencapsulated solution of said color precursor in said color oil carrier.

* * * * *